(12) United States Patent
Hetland

(10) Patent No.: US 7,325,515 B2
(45) Date of Patent: Feb. 5, 2008

(54) APPARATUS AND METHOD FOR WALKING ANIMALS

(76) Inventor: Joseph Tucker Hetland, 5256 Zenith Ave. South, Minneapolis, MN (US) 56410

( * ) Notice: Subject to any disclaimer, the term of this patent is extended or adjusted under 35 U.S.C. 154(b) by 55 days.

(21) Appl. No.: 11/097,436

(22) Filed: Apr. 1, 2005

(65) Prior Publication Data
US 2006/0185618 A1 Aug. 24, 2006

Related U.S. Application Data

(60) Provisional application No. 60/654,179, filed on Feb. 18, 2005.

(51) Int. Cl.
*A01K 7/00* (2006.01)
(52) U.S. Cl. ............................................. 119/795
(58) Field of Classification Search ............... 119/795, 119/796, 771, 787, 788; D30/153, 154
See application file for complete search history.

(56) References Cited

U.S. PATENT DOCUMENTS

| | | | | |
|---|---|---|---|---|
| 2,737,154 A | 3/1956 | Michonski | ............... | 119/109 |
| 2,827,017 A | 3/1958 | Ryan | ............... | 119/109 |
| 2,909,154 A | 10/1959 | Thomas | ............... | 119/109 |
| 3,120,403 A | 2/1964 | Molzan et al. | ............... | 294/74 |
| 3,286,962 A | 11/1966 | Warth | | |
| 3,311,088 A | 3/1967 | Peterlin | ............... | 119/109 |
| 3,752,127 A | 8/1973 | Baker | ............... | 119/109 |
| 3,884,190 A | 5/1975 | Gurrey | ............... | 119/109 |
| 4,134,364 A * | 1/1979 | Boncela | ............... | 119/771 |
| 4,563,981 A | 1/1986 | Kramer | ............... | 119/96 |
| 4,879,972 A | 11/1989 | Crowe et al. | ............... | 119/109 |
| 4,892,063 A | 1/1990 | Garrigan | ............... | 119/109 |
| 5,361,726 A * | 11/1994 | Harris et al. | ............... | 119/797 |
| 5,551,379 A | 9/1996 | Hart | ............... | 119/771 |
| 5,632,234 A | 5/1997 | Parker | ............... | 119/795 |
| 5,701,848 A | 12/1997 | Tozawa | ............... | 119/797 |
| 5,724,921 A | 3/1998 | Bell | | |
| 5,852,988 A | 12/1998 | Gish | ............... | 119/795 |
| 5,901,668 A * | 5/1999 | Goodger, Sr. | ............... | 119/795 |
| D425,265 S | 5/2000 | Rubinstein | ............... | D30/153 |
| 6,237,539 B1 | 5/2001 | Sporn | ............... | 119/795 |
| 6,247,428 B1 | 6/2001 | Mireles | ............... | 119/795 |
| 6,273,029 B1 * | 8/2001 | Gish | ............... | 119/792 |
| 6,460,488 B1 | 10/2002 | Manzella et al. | | |
| 6,626,132 B1 | 9/2003 | Mann | ............... | 119/795 |

(Continued)

*Primary Examiner*—Thomas Price
(74) *Attorney, Agent, or Firm*—Pulsinelli Shalton Flanigan Suelthaus PC

(57) ABSTRACT

The present invention relates to an apparatus for walking two animals, including: a holding member; a rotating member rotatably connected to or attached to the holding member; and the rotating member including a face portion comprising a first connection device and a second connection device, wherein the first connection device and the second connection device are positioned at approximately opposite sides of the face portion. The present invention further relates to a method of walking two animals, including attaching a first animal via a first leash to a first connection device of a rotating member; attaching a second animal via a second leash to a second connection device of the rotating member, wherein the first connection device and the second connection device are positioned at approximately opposite sides of the rotating member; and providing a holding member rotatably connected to or rotatably attached to the rotating member; and walking the two animals attached to the rotating member.

18 Claims, 18 Drawing Sheets

U.S. PATENT DOCUMENTS

| | | |
|---|---|---|
| 6,766,770 B1 | 7/2004 | Voorhees |
| 6,792,893 B1 * | 9/2004 | Quintero et al. ............ 119/796 |
| 7,040,256 B2 * | 5/2006 | Wiggins .................... 119/796 |
| 7,207,296 B2 * | 4/2007 | DiDonato ................... 119/796 |
| 2003/0041811 A1 * | 3/2003 | Russell et al. .............. 119/771 |
| 2006/0201449 A1 * | 9/2006 | DiDonato ................... 119/795 |

* cited by examiner

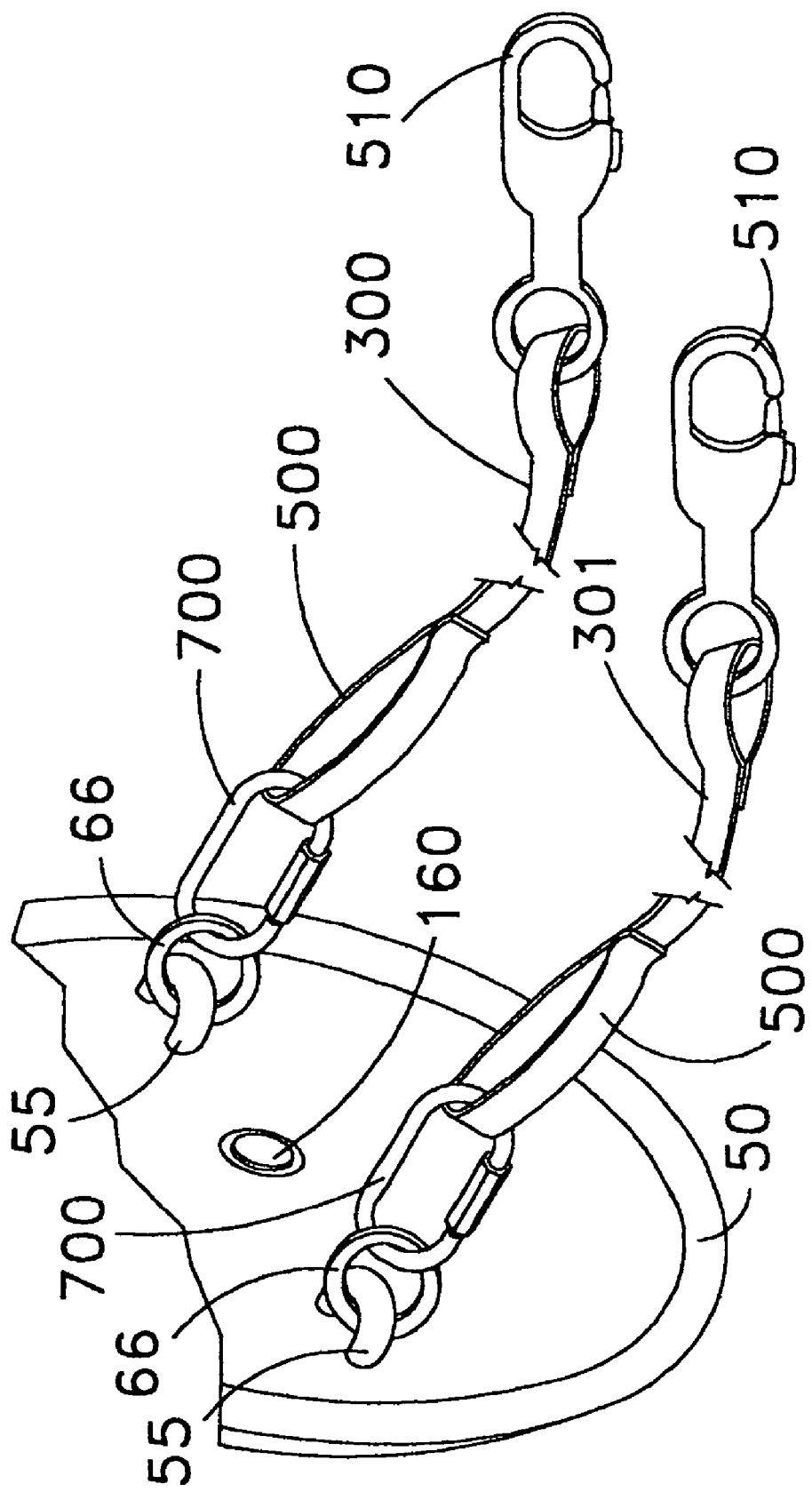

US 7,325,515 B2

APPARATUS AND METHOD FOR WALKING ANIMALS

This application claims priority to U.S. Provisional Patent Application No. 60/654,179 filed Feb. 18, 2005.

FIELD OF THE INVENTION

The present invention relates to an apparatus and a method for walking two animals, including a holding member and a rotating member that reduces tangling of two leashes for the two animals.

BACKGROUND OF THE INVENTION

Owners of multiple animals face a tangling problem when attempting to simultaneously "walk" two animals with two leashes. The two animals' independent movements from left to right often result in the crossing of the two leashes, thereby causing the two leashes to tangle. This requires the owner to stop the walk and bend down to manually untangle the leashes. Besides being an inconvenience, the tangled leashes may distract the owner from oncoming traffic. Further, the owner may have to disconnect one or both of the animals to untangle the two leashes, which can expose the two animals to a break away situation. The owner may also inadvertently drop one of the two leashes, likewise exposing the two animals to a break away situation. The untangling of the two leashes is also difficult for those with disabilities or could lead to a back injury or a fall of the owner while attempting to untangle the two leashes.

SUMMARY OF THE INVENTION

The present invention relates to an apparatus and a method for walking two animals, including a holding member and a rotating member that reduces tangling of two leashes for the two animals. The apparatus comprises the rotating member, which is rotatably connected to or attached to the holding member. The rotating member comprises a first connection means and a second connection means, wherein the first connection means and the second connection means are positioned at approximately opposite sides of the rotating member. The two animals are connected to the rotating member via a first leash to the first connection means and via a second leash to the second connection means. In the alternative, the rotating member may include the first leash and the second leash as fixed attachments to the rotating member. By positioning either the first connection means and the second connection means or the first fixed leash and the second fixed leash at approximately opposite sides of the rotating member, the movements of the two animals that cross the first leash and the second leash rotate the rotating member, thus reducing the tangling of the first leash and the second leash.

The method comprises attaching the first animal via the first leash to the rotating member and attaching the second animal via the second leash to the rotating member. The two animals rotate the rotating member and reduce tangling of the first leash and the second leash. An operator may also rotate the rotating member to untangle the first leash and the second leash.

BRIEF DESCRIPTION OF THE DRAWINGS

FIG. 14 shows a cut away of the two leashes connected to the apparatus.

DETAILED DESCRIPTION OF THE PREFERRED EMBODIMENT

Figure 1:
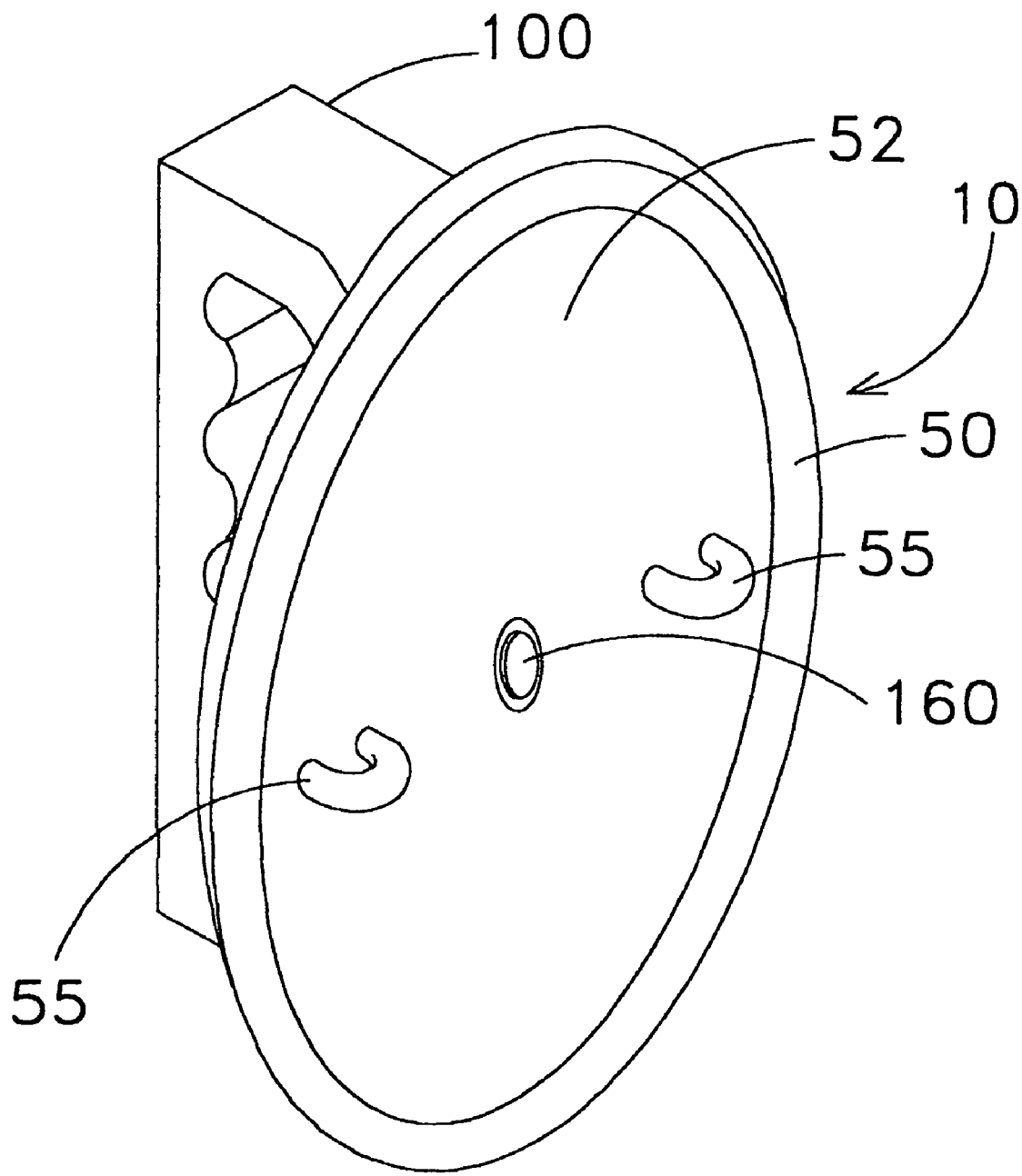
FIG. 1 shows a perspective view of the apparatus.

The present invention relates to an apparatus and a method for simultaneously walking two animals. The apparatus comprises a holding member and a rotating member, and the rotating member comprises connection means for attaching leashes or leads to the two animals. Instead of having connection means for attaching the leashes or leads, the rotating member may include two fixed leashes. The rotating member is rotatably connected to the holding member. When walking the two animals using the apparatus and the method, the rotation of the rotating member reduces the likelihood of the two leashes tangling.

The rotating member includes connection means or a connection device to attach the two animals via two leashes. The connection means or the connection device include eyes, loops, D-rings, or the like to connect to a fastener from the two leashes. The two leashes may removably connect to the connection means or to the connection device. The connection means may also include a swivel connection, such that the connection means rotate. In the alternative, the two leashes may be in a more fixed attachment to the rotating member. For example, the two fixed leashes may be integral with the rotating member, and the connection means or the connection device is unneeded.

The two connection means or the two fixed leashes are positioned on a face of the rotating member. It is important that a distance separates the two connection means or the two fixed leashes. It is also important that the two connection means or the two fixed leashes are positioned on opposite sides, i.e., at approximately 180 degrees from each other, of the face portion of the rotating member. This opposite positioning and the distance assists in transferring the force from the crossing of the two animals to the rotating member, which causes the rotation of the rotating member in reaction to the force from the crossing of the two animals. The positioning of the connection means or the two fixed leashes on the opposite sides of the rotating member is such that the connection means and connection points (where the two fixed leashes are connected to the rotating member) are held in a fixed relationship, i.e., during the use of the invention, the connections means and the connection points do not travel or move toward each other. This maintains the distance between the two connection means and the two fixed leashes The holding member provides a holding region or a gripping surface for the operator to hold or grip the apparatus. The holding member may be integral with or connected to the rotating member. The holding member may be of many different shapes, depending upon the preference of the user. However, the holding member should be of a shape or of a construction that remains fixed or stationary while the rotating member rotates relative to the holding member. The holding member provides for secure grip between the operator and the apparatus. The holding member is preferably constructed of a rigid or a firm material that does not itself tangle. The fixed nature of the holding member in combination with the rotating member absorbs the impact of an animal yanking on the leash or the impact of the two animals crossing their leashes.

The rotating member is rotatably connected to the holding member. The rotating member may be connected to the holding member via a nut, a rivet, a codder pen, or other connection device that provides for the rotating member to rotate independently from the holding member, i.e., the rotating member rotates while the holding member remains steady. In certain embodiments, a ball bearing system may be employed. In certain embodiments, the rotating member may include a hub, and the rotating member rotates about the hub. The hub may include a cavity or opening in its center to receive an axle, or the hub may be connected to the holding member.

Figure 2:
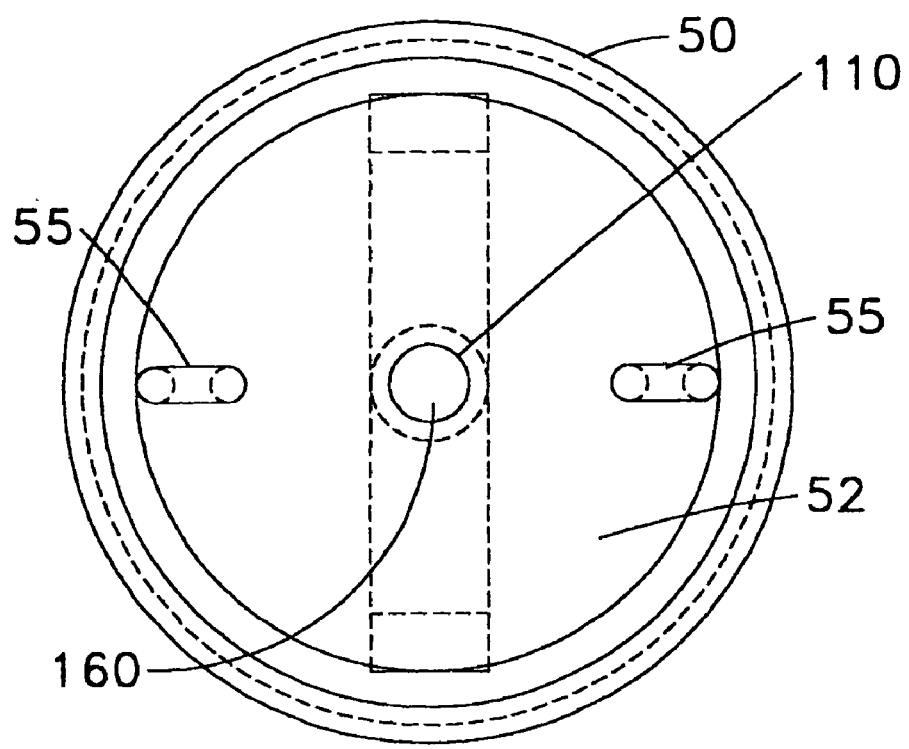
FIG. 2 shows a front view of the apparatus.
Figure 3:
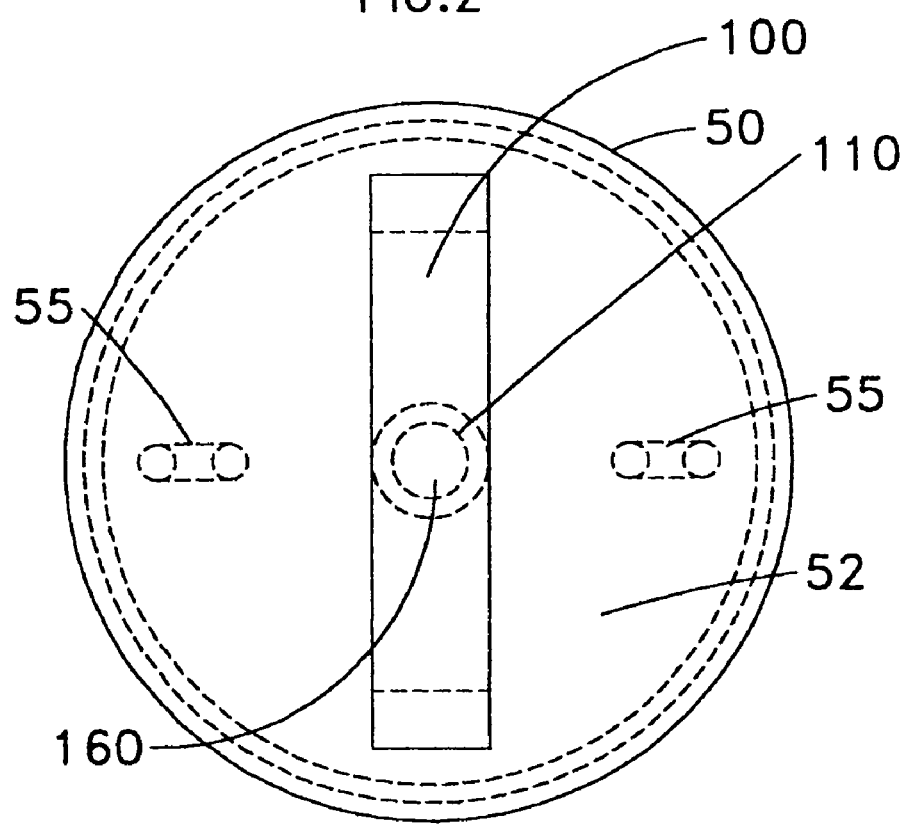
FIG. 3 shows a rear view of the apparatus.
Figure 4:
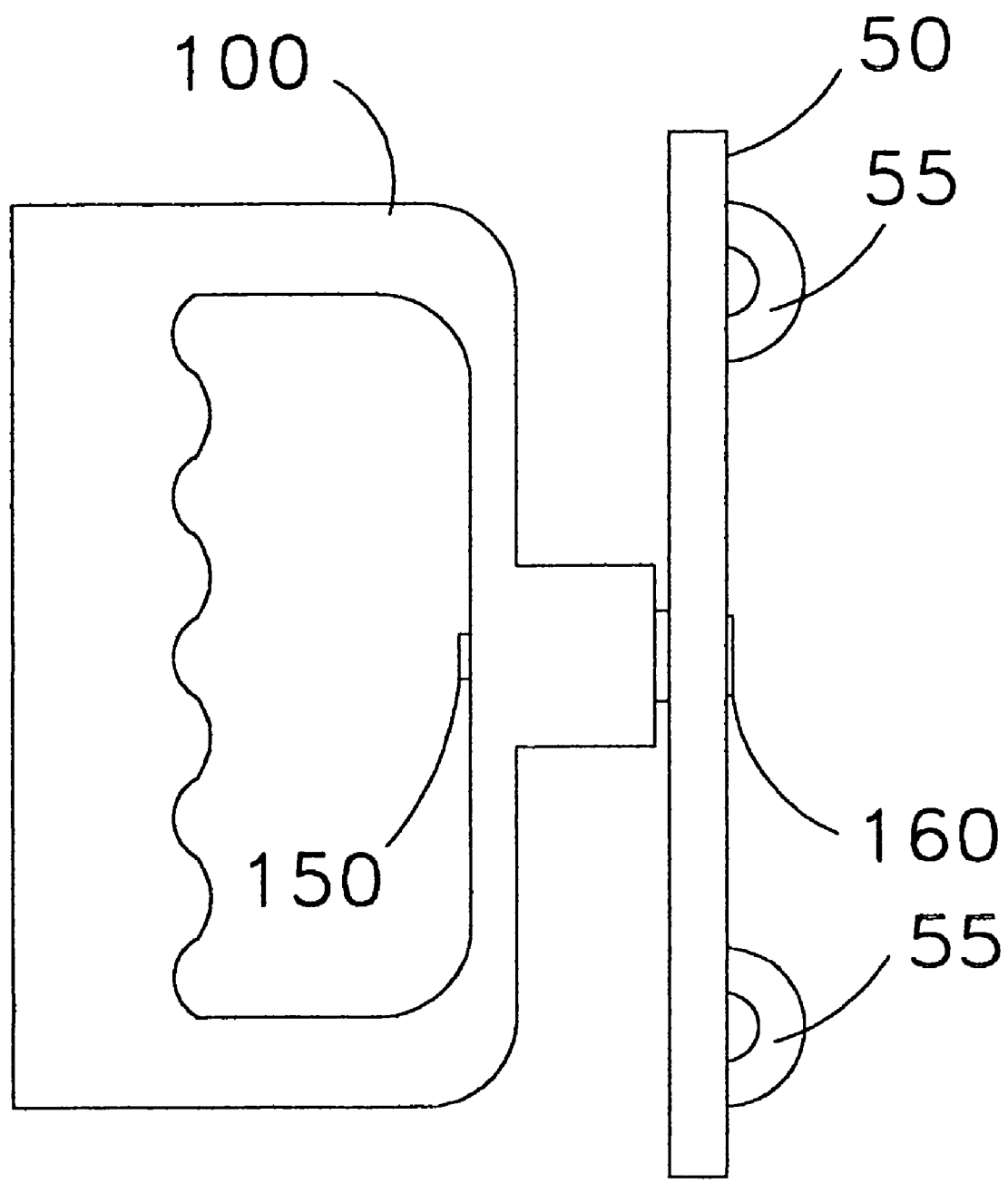
FIG. 4 shows a side view of the apparatus.
Figure 5:
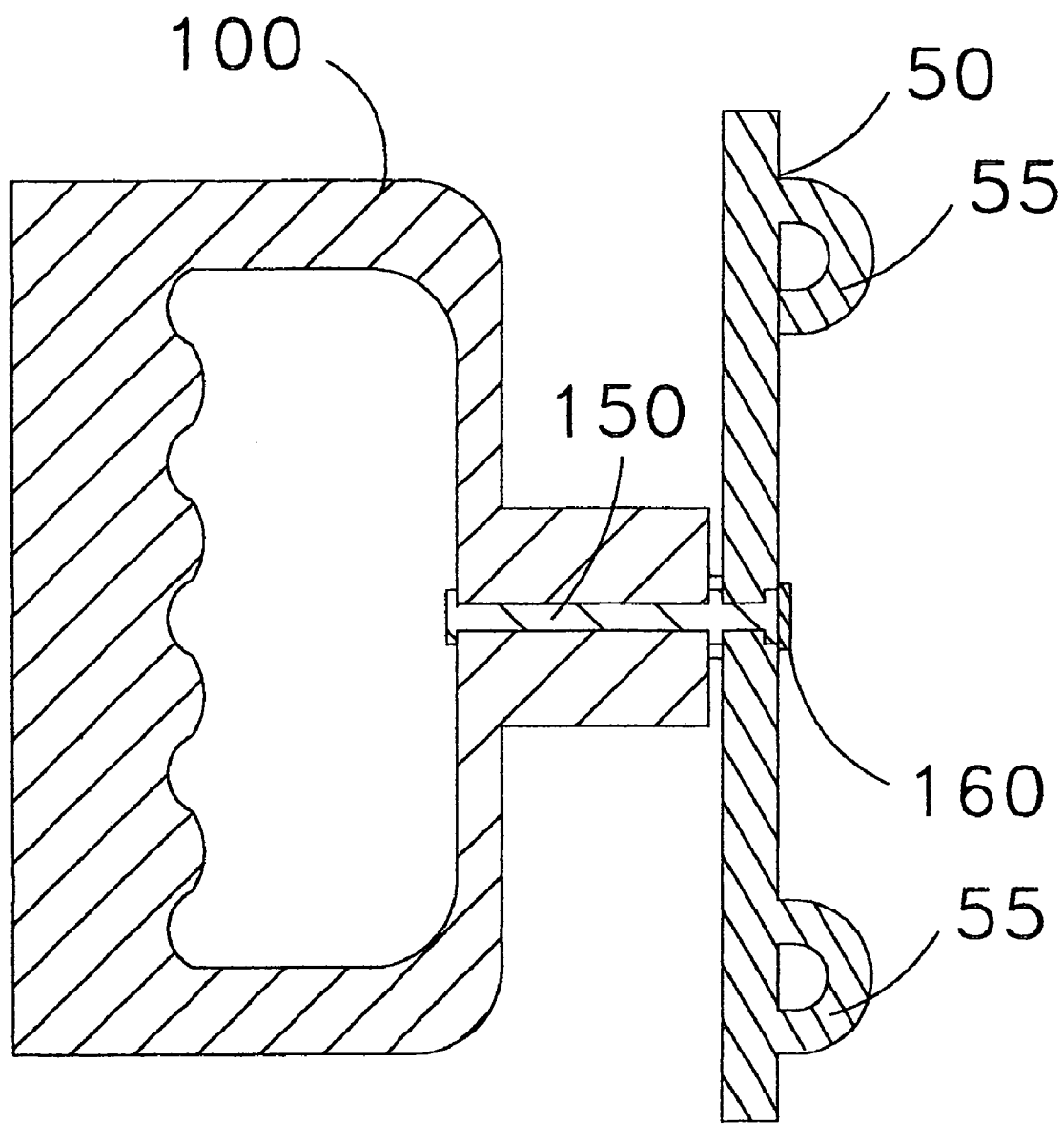
FIG. 5 shows a cross section view of the apparatus.
Figure 6:
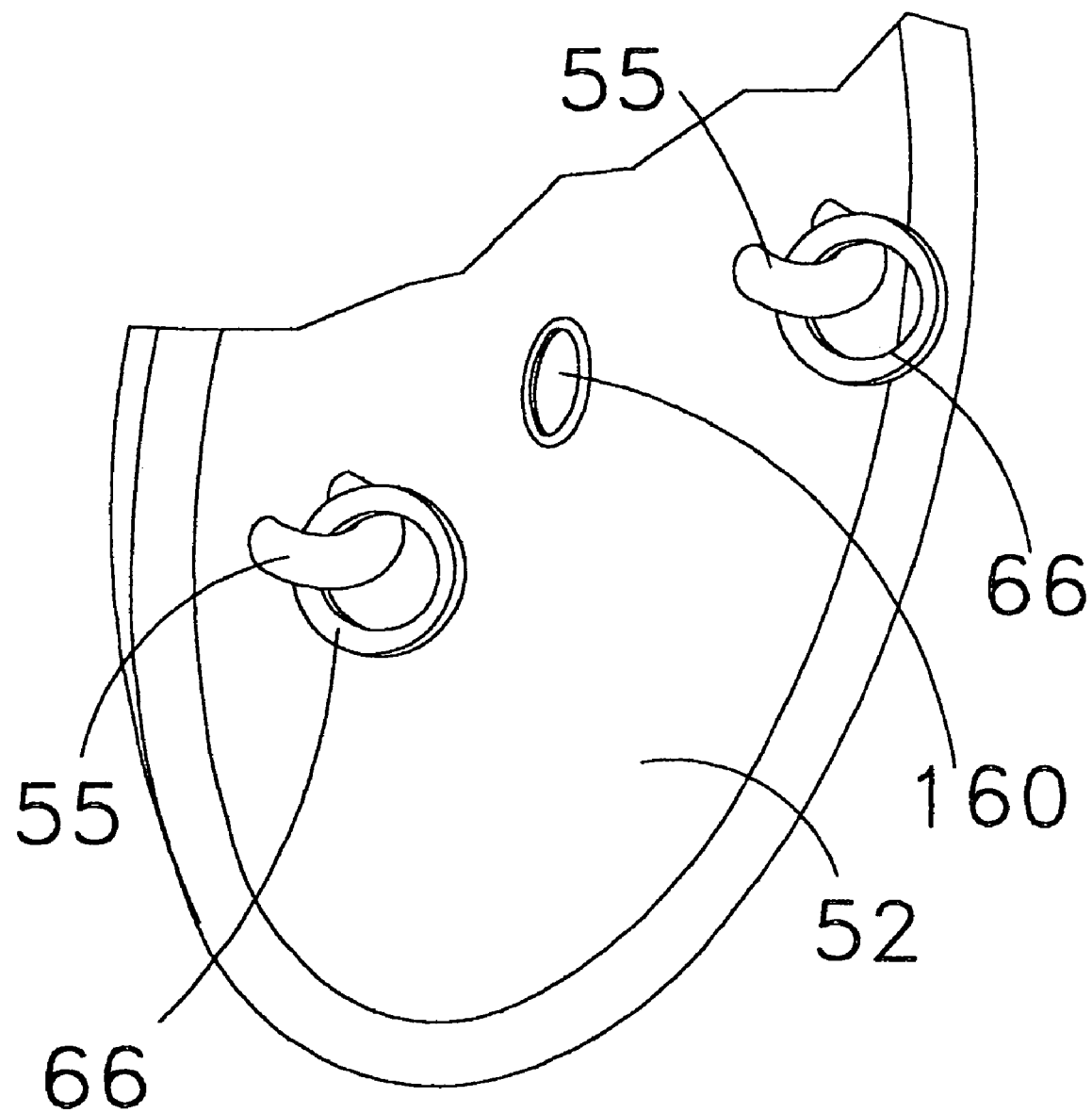
FIG. 6 shows a cut away view of the apparatus.
Figure 7:
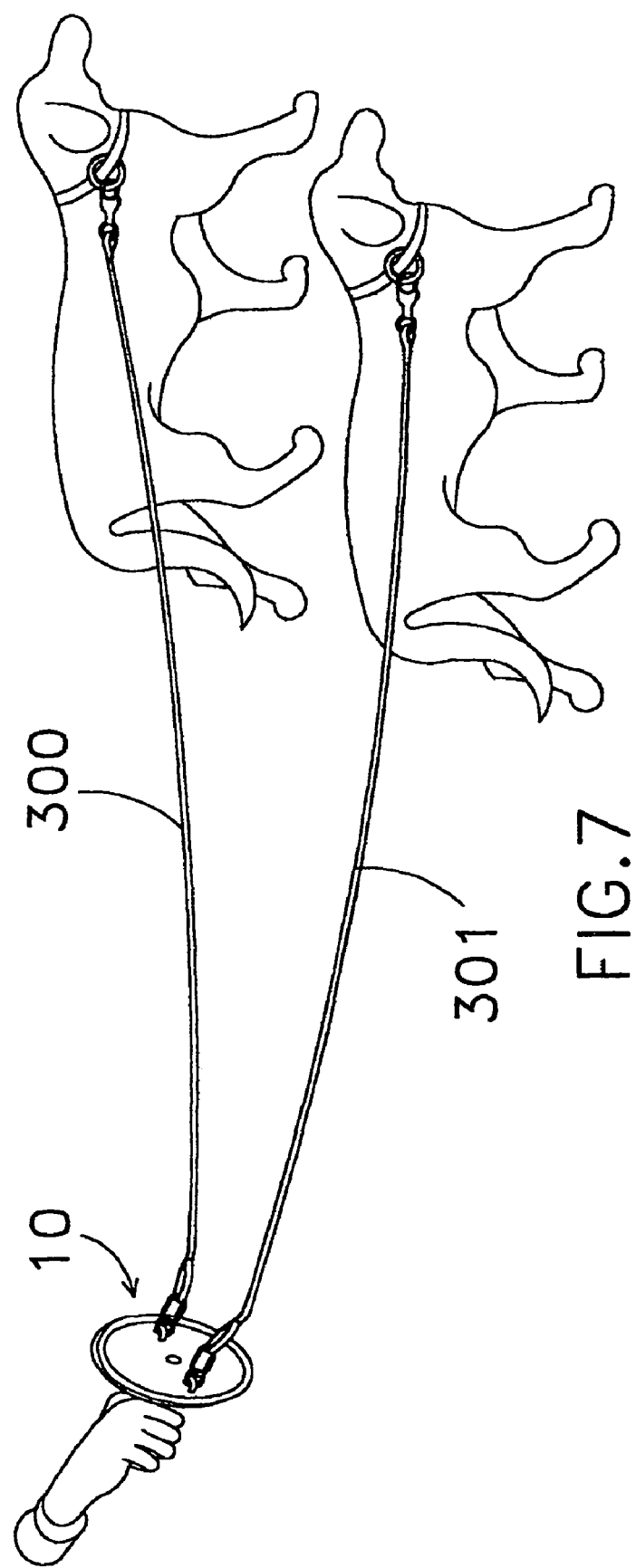
FIG. 7 shows the apparatus used with two animals.

In a first embodiment shown in FIG. 1, an apparatus 10 comprises a rotating member 50 that rotates or spins about an axle 150 integral with or connected to a holding member 100. The holding member 100 has a shovel grip. The rotating member 50 preferably has a circular or a wheel shape. A face portion 52 is the side of the rotating member 100 facing the animals. The rotating member 100 has a hole 110 (shown in FIG. 2 and FIG. 3) that is centered in the face portion 52 to receive the axle 150 (shown in FIG. 4 and in FIG. 5). The rotating member 100 rotates or spins about the axle 150. A fastener 160 holds the rotating member on the axle 150. Connection means 55 are provided on the face portion 52. As shown in FIG. 6, the connection means 55 include optional rings 66 that receive a leash. FIG. 7 depicts the use of the apparatus 10 with a leash 300 and a leash 301.

As discussed above, it is important that the two connection means or the two fixed leashes are fixed at approximately opposite sides of the face portion of the rotating member. This provides balance to the apparatus. When the two animals are both pulling in forward direction, the rotating member does not generally rotate due to the balance. Of course, the rotating member may rotate slightly, if for example, one animal is pulling harder than the other animal. When one animal veers away from the other animal and has not crossed the two leashes, the rotating member does not generally rotate due to the balance. However, when the two animals cross paths and the two crossed leashes pull on the rotating member, the rotating member rotates in response to the pulling force and seeks a position of equilibrium, which is an untangled position. Thus, the tangling of the two leashes is reduced.

Figure 8:
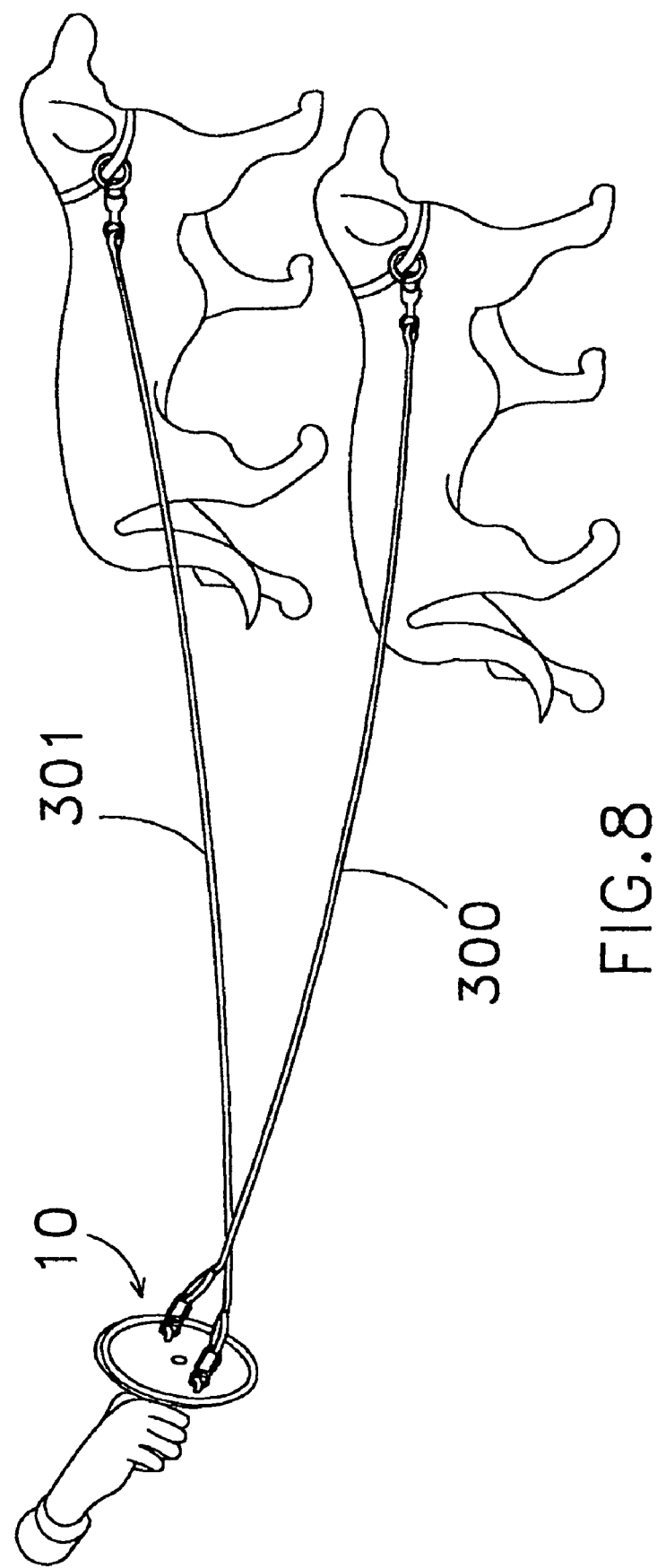
FIG. 8 shows a view of the apparatus used with two animals that have crossed the two leashes.
Figure 9:
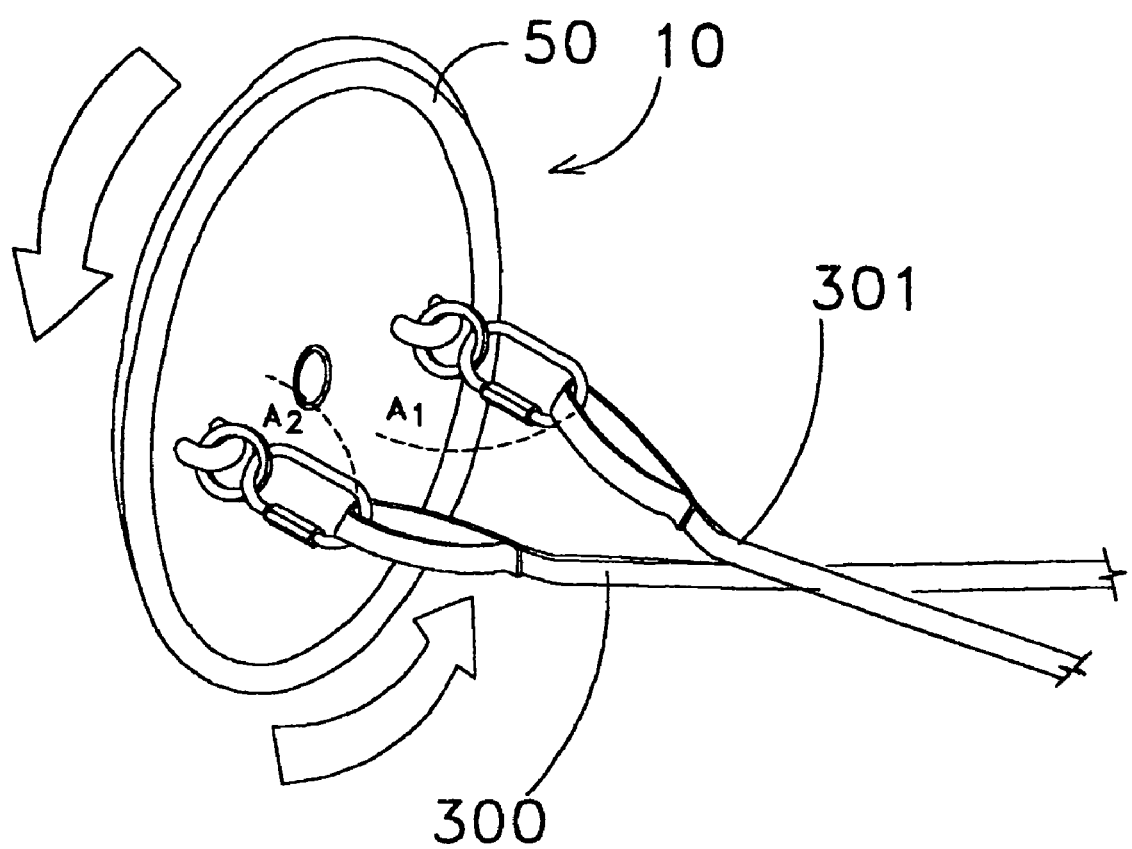
FIG. 9 shows a close-up view of the apparatus used with two animals that have crossed the two leashes.

As discussed above, it is important that a distance separates the two connection means or the fixed two leashes. In certain embodiments for walking two dogs on leashes of approximately four to approximately eight feet in length, the distance may be approximately three to approximately eight inches. Of course, one of ordinary skill in the art will be able to adjust the relative dimensions to the specific needs of the two animals and enjoy the benefits and advantages of the present invention. By separating the two connection means or the two fixed leashes on opposite sides of the rotating member, a tangle is easier to untangle by the rotation of the rotating member. This is due to the angle A1 and the angle A2 shown in FIG. 8 and FIG. 9. These angles transfer the force created by the two animals crossing leashes shown in (FIG. 8 and FIG. 9) to the rotating member. The rotating member may rotate in either a clockwise or a counterclockwise direction in response to this force to undue the tangling of the leash.

Figure 10:
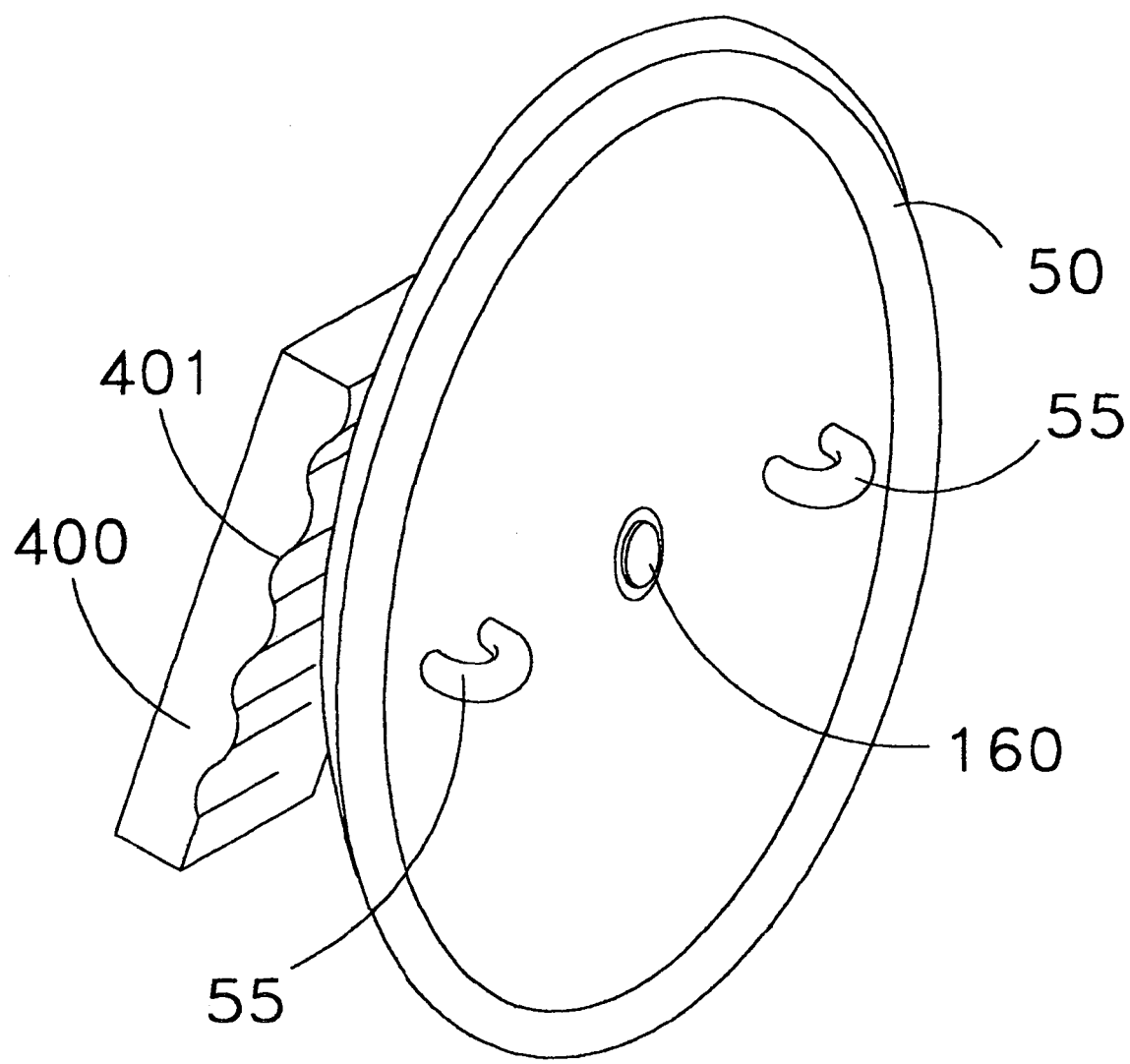
FIG. 10 shows a perspective view of the apparatus with a pistol grip.
Figure 11:
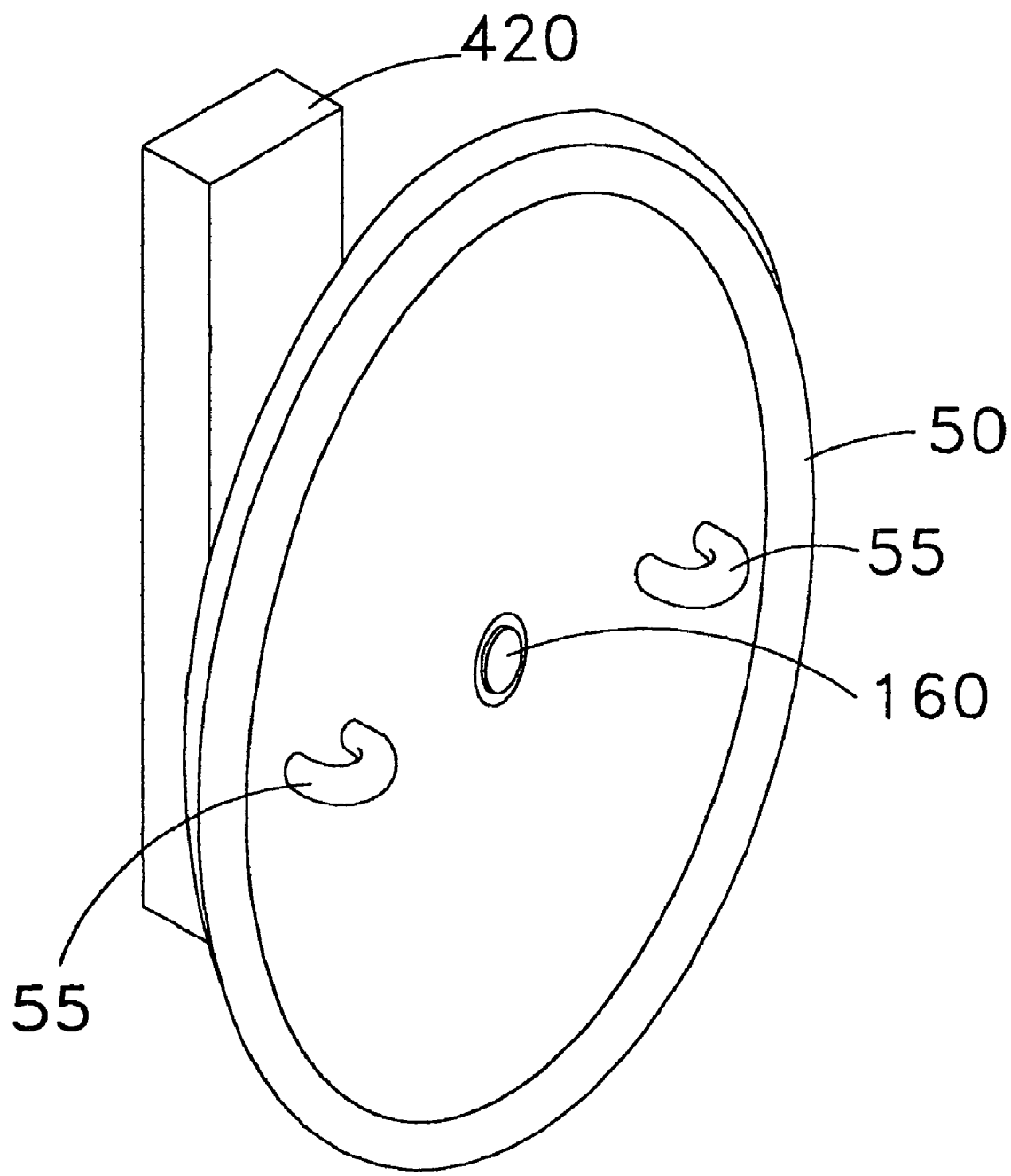
FIG. 11 shows a perspective view of the apparatus with a T-grip.
Figure 12:
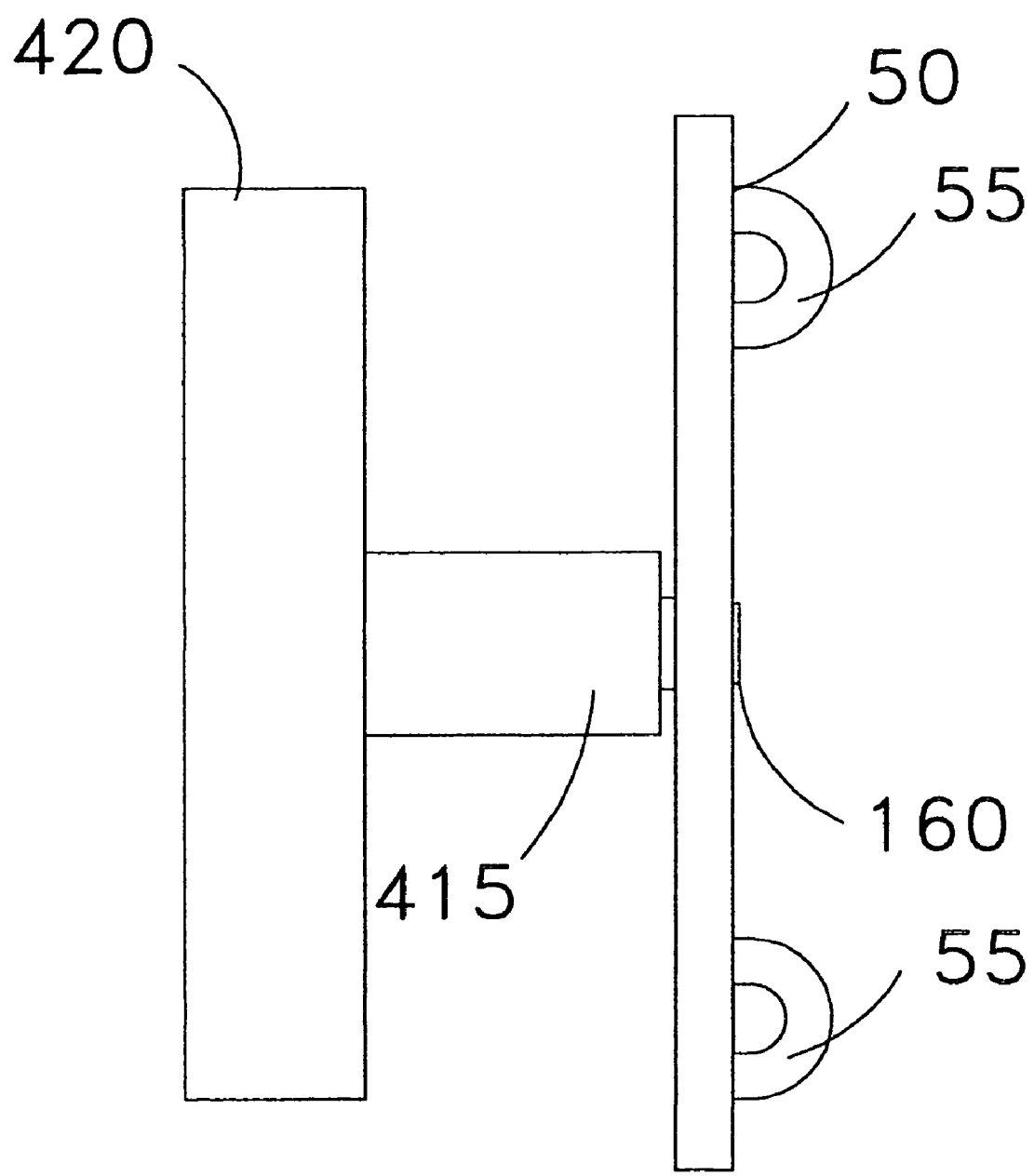
FIG. 12 shows a side view of the apparatus with a T-grip.
Figure 13A:
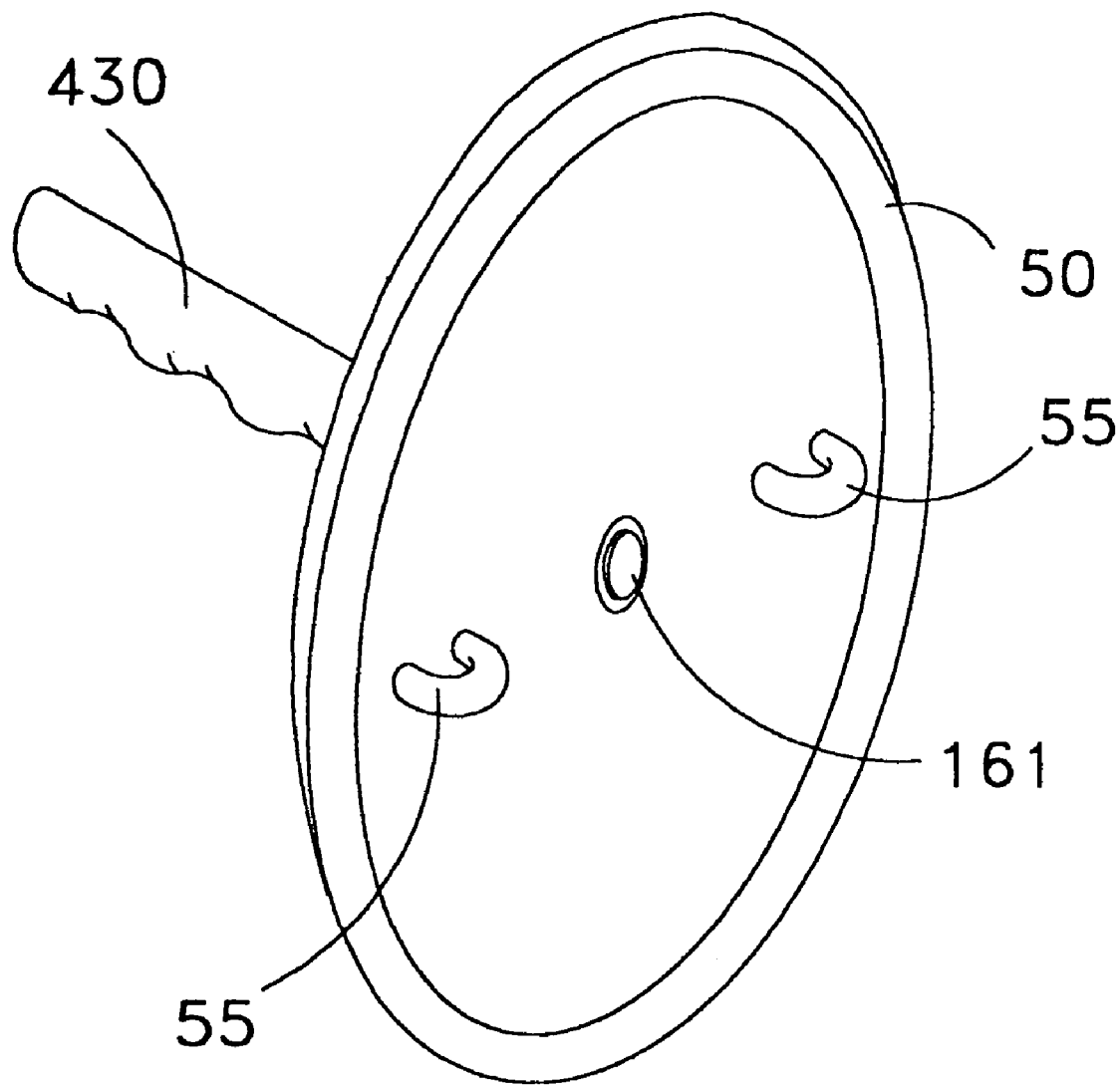
FIG. 13(a) shows a perspective view of the apparatus with a straight bar grip.
Figure 13B:
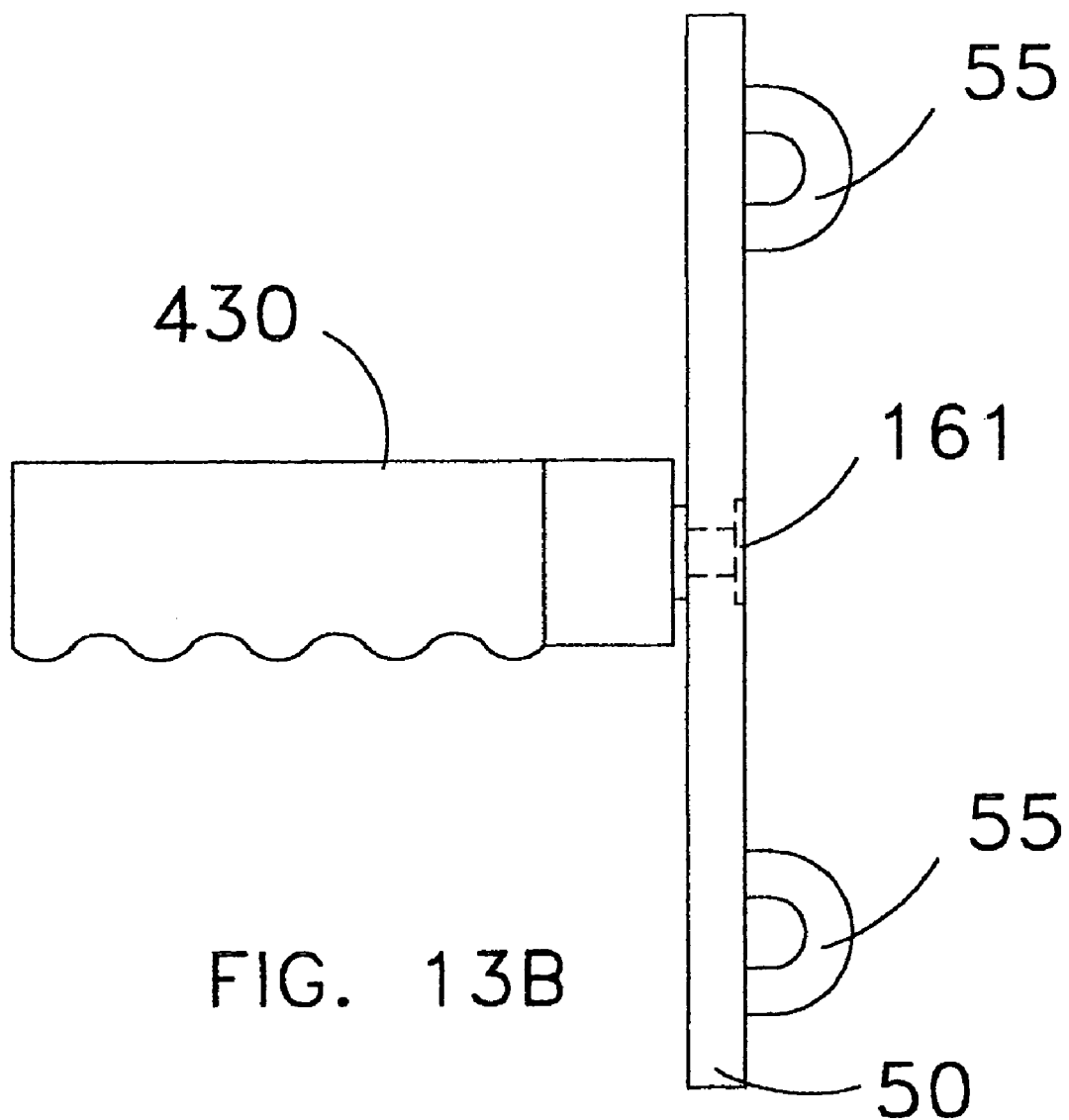
FIG. 13(b) shows a side view of the apparatus with a straight bar grip.
Figure 13C:
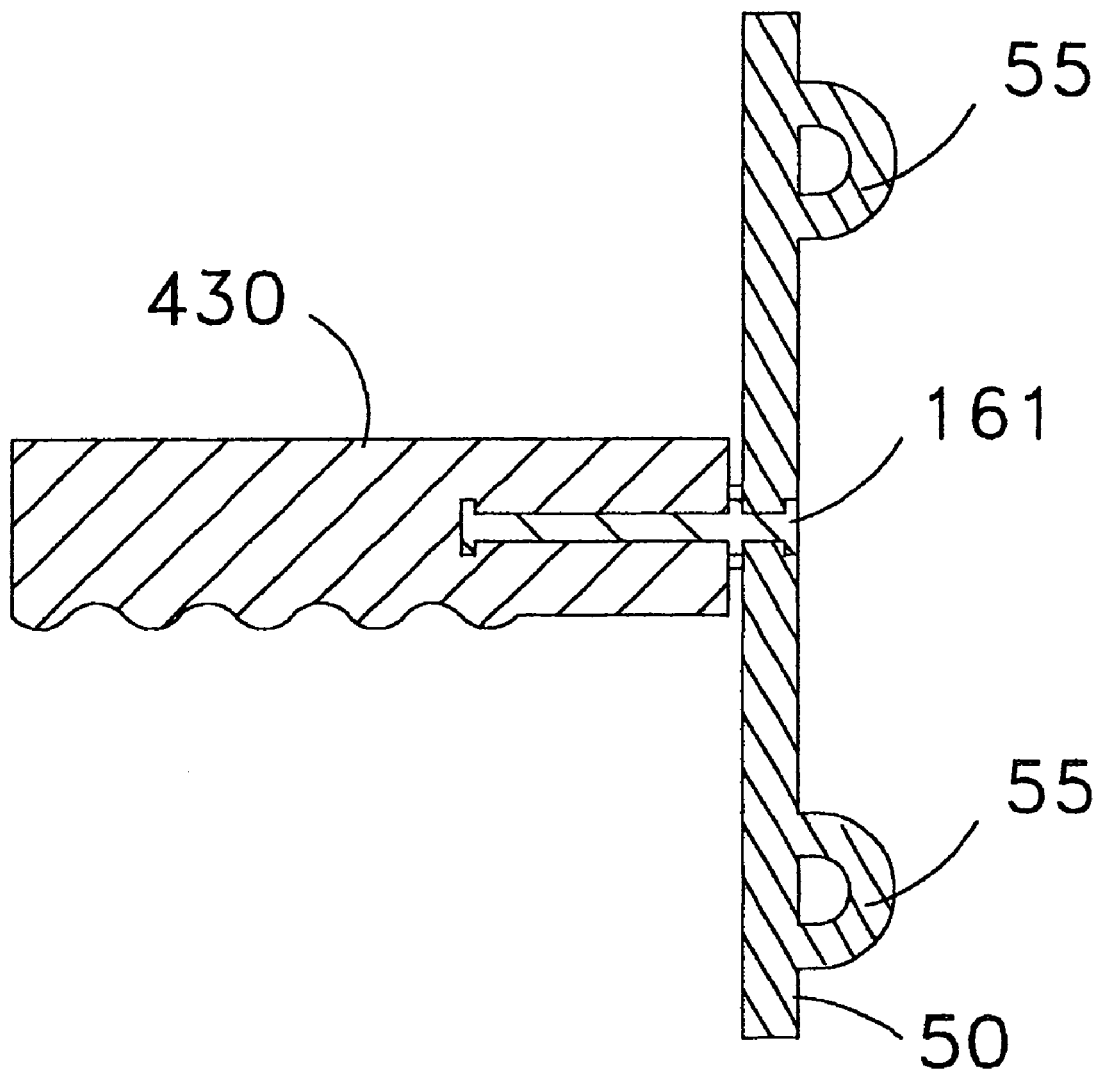
FIG. 13(c) shows a sectional view of the apparatus with a straight bar grip.

The holding member may include a pistol grip, a shovel grip like holding member 100, a T-grip, a straight bar, and the like. A pistol grip 400 shown in FIG. 10 includes a surface for the palm and fingers of the operator to wrap around. The pistol grip optionally includes indents 401 for the finger of the operator to grip. The holding member 100 includes a D-shaped or shovel member that the operator may grasp. A T-grip shown in FIG. 11 includes a first member 415 parallel to the rotation of the rotating member 50 and a second member 420 generally perpendicular to the first member 415. A straight bar grip 430 is shown in FIGS. 13(a)-13(c). In this embodiment, a recessed fastener 161 is recessed into the rotating member 50. An optional wrist strap or loop, similar to those used with ski poles, may be included with any of the holding members described herein and provides extra security in the holding of the holding member.

Figure 15:
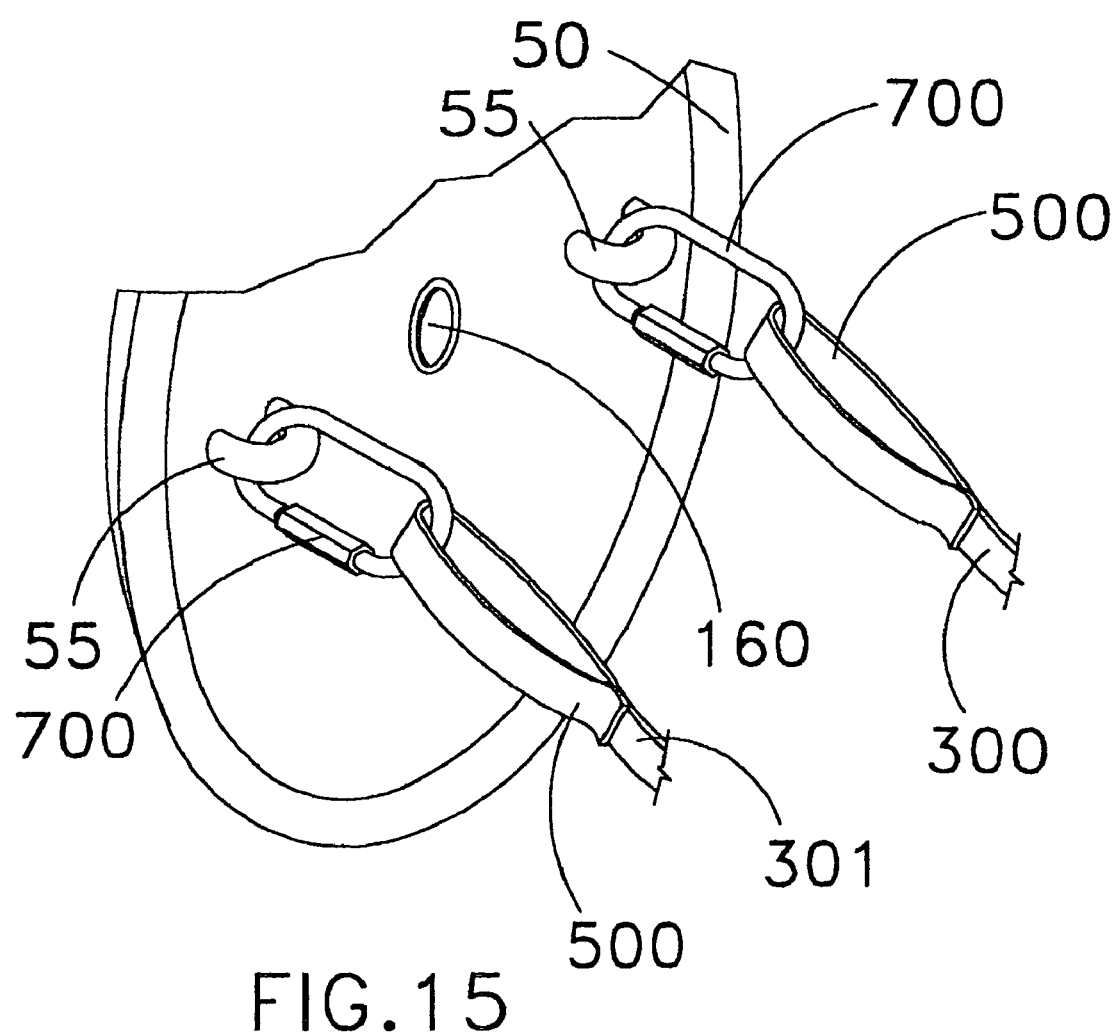
FIG. 15 shows the connection of the two leashes to the apparatus.

As used herein, the terms "leashes" or "lead" includes ropes, cords, belts, chains, of variety of materials, such as leather, nylon, cotton, metal, metal coated products, and the like. As shown in FIG. 14 and FIG. 15, the leashes 300 and 301 may include a handle region 500 on a first end for the user to grasp. The leashes 300 and 301 may include a snap 510, a clasp, or other closure member on a second end to connect to a collar of the animal. In the alternative, the leashes 300 and 301 or lead may include the snap 510, clasp, or other fastening member on the first end and on the second end. This alternative leash may connect to both the connection means on the rotating member and to the animal.

As used herein, the term "fixed leash" refers to a leash that is fixed to the rotating member by a rivet, staple, screw, adhesive, etc. or is integral with the rotating member and protrudes from the rotating member. If fixed leashes are used, then it is important that they are positioned on approximately opposite sides of the rotating member.

All sorts of animals, including dogs, cats, ferrets and the like, may be connected to the apparatus. The apparatus may be scaled up for larger animals and scaled down for smaller animals.

By having the two connection means or two permanent leashes on approximately opposite sides of the face of the rotating member, the rotating member will rotate or spin to compensate for the movements of the animals connected to the apparatus. It is important that the two connection means or two fixed leashes are on approximately opposite sides of the face portion. This opposite positioning provides balance to the apparatus in that the rotating member will rotate to prevent the two leashes from tangling as the two animals move in various directions.

The first embodiment of the invention provides the operator with several advantages. Namely, the apparatus responds to the crossing of the two leashes by the two animals to reduce tangles. As used herein, the phrase "to reduce tangle" includes the rotation of the rotating member in response to movements of the two animals that cross the two leashes, thus untangling the two leashes. The rotating member will not eliminate all tangles, but the rotating member will reduce the occurrence of tangled leashes from the two animals crossing the two leashes. Also, the operator has the option of manually rotating the rotating member as the movements of the animals are anticipated that could lead to a tangle. Thus, the manual rotation can be used to avoid a tangle in the first place. This manual rotation feature also allows the operator an easy and safe method of untangling the two leashes in the event that the rotating member does not first untangle the two crossed leashes. For example, if multiple tangles occur or the two animals are pulling in the same direction, then the manual rotation of the wheel will assist the operator in untangling the two leashes.

Figure 16:
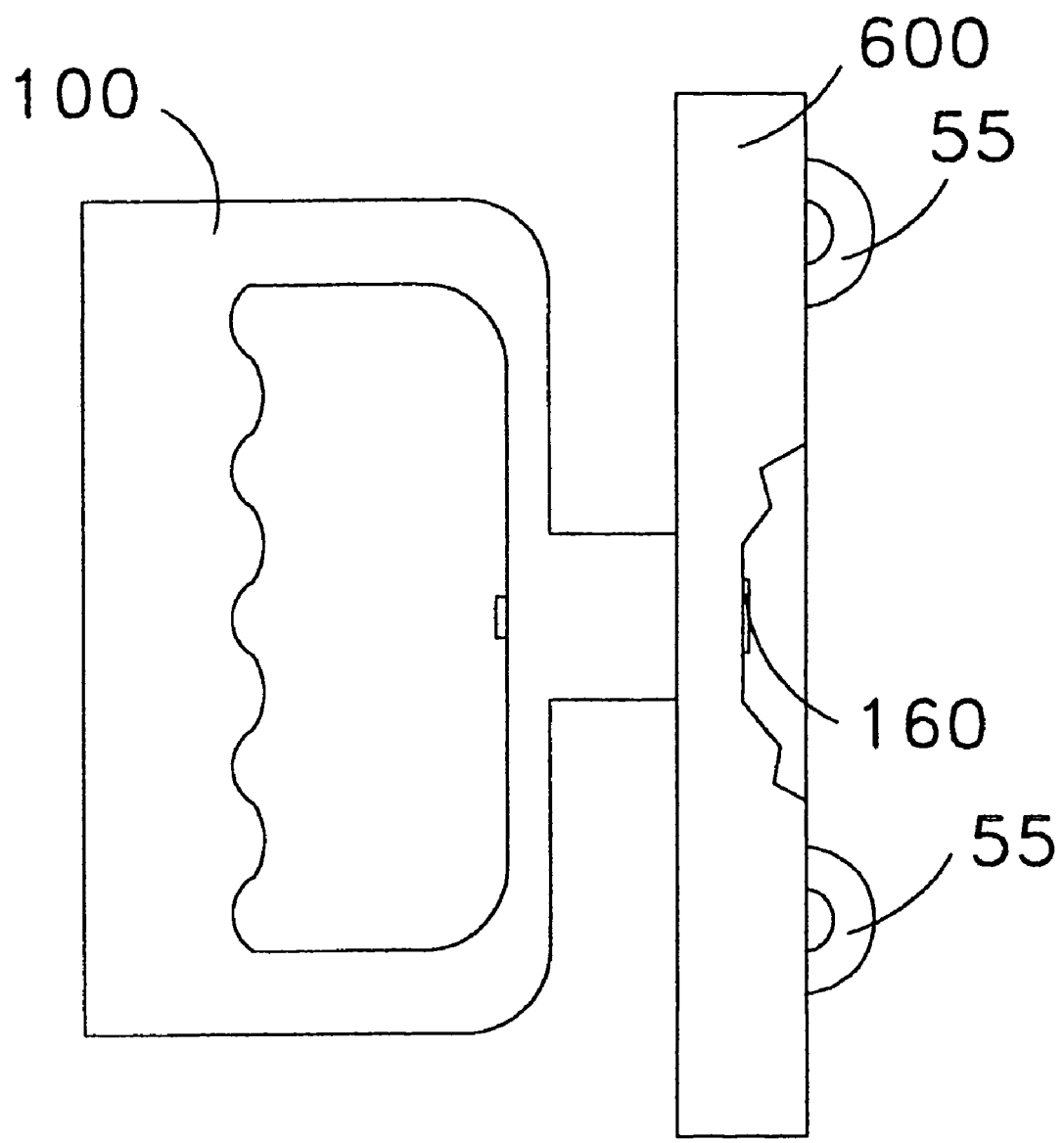
FIG. 16 is a side view of the embodiment with the housing.
Figure 17:
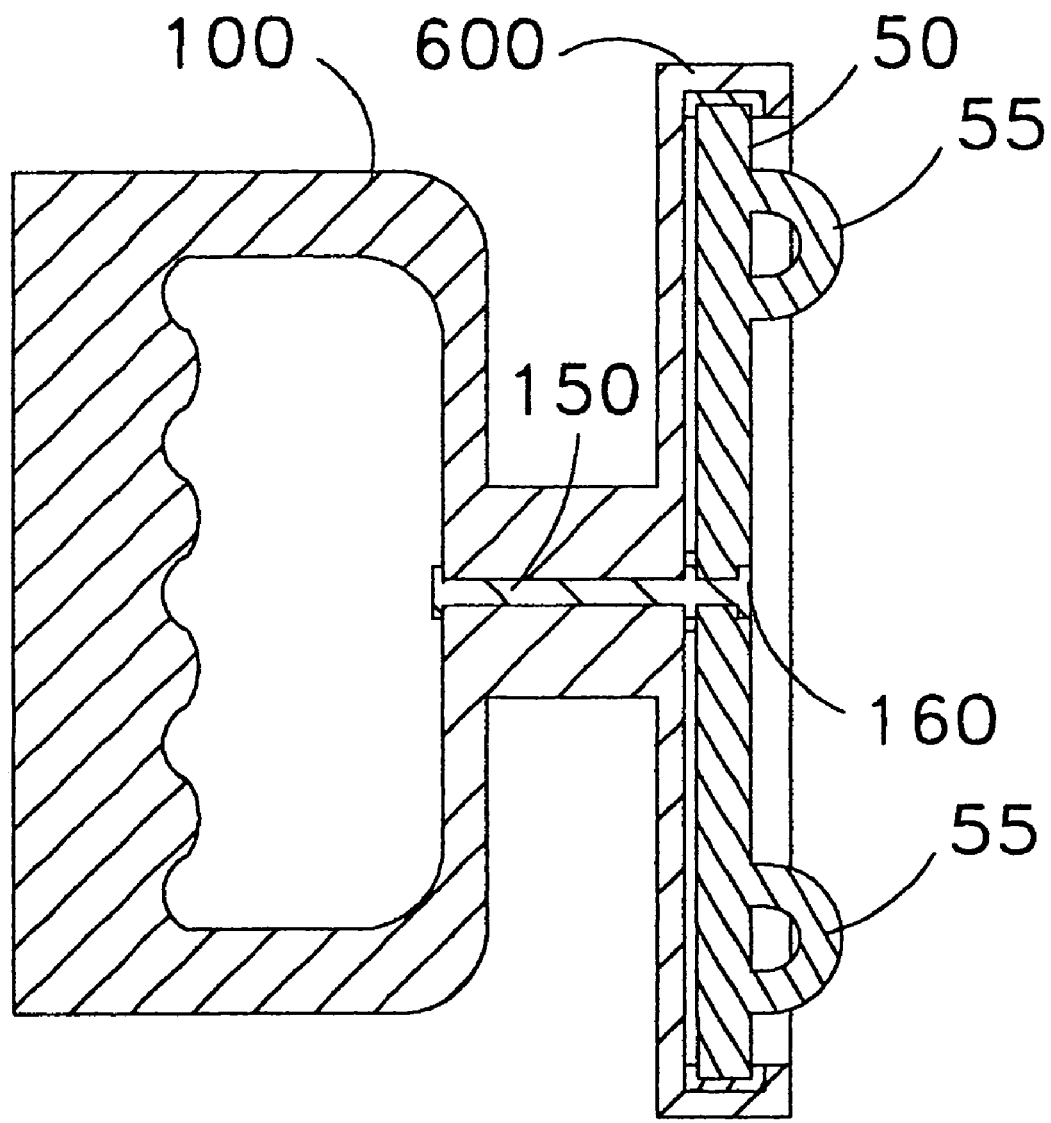
FIG. 17 is a cross section view of the embodiment with the housing.

In a second embodiment of the invention shown in FIG. 16 and in FIG. 17, the rotating member 50 is partially enclosed by a housing 600. The second embodiment provides for the two animals to untangle their two leashes by the rotation of the rotating member, however, the housing 600 reduces access to the periphery of the rotating member for the operator to manually rotate the rotating member to untangle the two leashes.

In some embodiments of the present invention, carabineers 700 are connected to the connection means 55. The size of the carabineers 700 allows the handle of a conventional leash to be connected to the carabineers 700 and to the apparatus 10. This would allow the operator to connect the conventional leashes for two animals to the apparatus for a walk, and then as desired, remove one or both animals from the apparatus and still have a handle of the leash to hold onto.

During use of the apparatus, the two animals are attached to the leashes for the walk. During the walk, as the pets independently move from the left to right and vice versa, thereby exposing the leashes to crossing each other and becoming tangled, the rotation of the rotating member results in the leashes uncrossing, thereby not becoming tangled.

Various safety means may be included with the apparatus of the present invention. For example, a flashlight could be incorporated into the apparatus, such as into the holding member. Also, reflective materials, such as luminescent paints or reflective stickers, may be used in the construction of the apparatus.

The apparatus may further comprise a dispenser or holder for waste bags. For example, the holding member may include a hollow section to store or dispense waste bags. In other embodiments, a clip attached to the holding member may hold waste bags at the ready.

As is evident from the foregoing description, certain aspects of the present invention are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the present invention.

What is claimed is:

1. An apparatus for walking two animals, comprising:
   a holding member;
   a circular rotating member rotatably connected to or attached to the holding member for rotation of the circular rotating member independent from the holding member; and
   the circular rotating member, including a face portion comprising a first connection means and a second connection means, wherein the first connection means and the second connection means are fixed to the face portion at approximately opposite sides of the face portion.

2. The apparatus according to claim 1, wherein the first connection means and the second connection means are separated by a distance.

3. The apparatus according to claim 1, further comprising:
   an axle, wherein the circular rotating member spins or rotates about the axle, and the holding member is connected to, attached to, or integral with the axle.

4. The apparatus according to claim 1, wherein the holding member includes a pistol handle, a shovel handle, a T-handle, or a bar handle.

5. The apparatus according to claim 1, wherein the first connection means and the second connection means comprise carabineers.

6. The apparatus according to claim 1, wherein a first leash and a second leash replace the first connection means and the second connection means; wherein the first leash and the second leash are fixed to the circular rotating member at positions on approximately opposite sides of the face portion.

7. The apparatus according to claim 1, wherein a user rotates the circular rotating member.

8. The apparatus according to claim 1, wherein a user rotates the circular rotating member to untangle a first leash connected to the first connection means and a second leash connected to the second connection means.

9. The apparatus according to claim 8, wherein the two animals rotate the circular rotating member and reduce tangling of the first leash and the second leash.

10. The apparatus according to claim 1, wherein the circular rotating member will rotate or spin to compensate for the movements of the animals connected to the apparatus.

11. The apparatus according to claim 1, wherein a first leash is connected to the first connection means and a second leash is connected to the second connection means, wherein the first leash and the second leash transfer a pulling force to the circular rotating member from the two animals connected to the first leash and to the second leash.

12. The apparatus according to claim 11, wherein the transfer of the pulling force causes the circular rotating member to rotate.

13. The apparatus according to claim 11, wherein the transfer of the pulling force causes the circular rotating member to rotate in response to the pulling force.

14. An apparatus for walking two animals comprising:
   an axle having a holding region on a first side of the axle; and
   a circular rotating member rotatably connected or rotatably attached to a second side of the axle; wherein a first connection means and the second connection means are fixed at approximately opposite sides of the circular rotating member.

15. A method of walking two animals, comprising:
   attaching a first animal via a first leash to a first connection means of a circular rotating member;
   attaching a second animal via a second leash to a second connection means of the circular rotating member, wherein the first connection means and the second connection means are fixed at approximately opposite sides of the circular rotating member; and providing a holding member rotatably connected to or rotatably attached to the circular rotating member; and walking the two animals attached to the circular rotating member, wherein the two animals rotate the circular rotating members and reduce tangling of the first leash and the second leash.

16. The method according to claim 15, wherein a user rotates the circular rotating member.

17. The method according to claim 15, wherein a user rotates the circular rotating member to untangle the first leash and the second leash.

18. An apparatus for walking two animals, comprising:

a holding member;

a rotating member rotatably connected to or attached to the holding member for rotation of the rotating member independent from the holding member;

and the rotating member, including a face portion comprising a first connection means and a second connection means, wherein the first connection means and the second connection means are positioned at approximately opposite sides of the face portion; and further comprising a housing that partially encloses the rotating member.

* * * * *